(12) United States Patent
Noguchi et al.

(10) Patent No.: US 7,338,071 B2
(45) Date of Patent: Mar. 4, 2008

(54) GUIDE UNIT FOR GUIDING CURTAIN AIRBAG AND CURTAIN AIRBAG DEVICE

(75) Inventors: Atsushi Noguchi, Moriguchi (JP); Tetsu Mitsuo, Nissin (JP)

(73) Assignee: Takata Corporation, Tokyo (JP)

( * ) Notice: Subject to any disclaimer, the term of this patent is extended or adjusted under 35 U.S.C. 154(b) by 451 days.

(21) Appl. No.: 11/013,916

(22) Filed: Dec. 17, 2004

(65) Prior Publication Data

US 2005/0134030 A1    Jun. 23, 2005

(30) Foreign Application Priority Data

Dec. 19, 2003    (JP)    ............................ 2003-423080

(51) Int. Cl.
 *B60R 21/16*    (2006.01)
(52) U.S. Cl. .................................. 280/730.2
(58) Field of Classification Search ............. 280/728.2, 280/730.2
 See application file for complete search history.

(56) References Cited

U.S. PATENT DOCUMENTS

| | | | |
|---|---|---|---|
| 6,237,938 B1 | 5/2001 | Boxey | |
| 6,305,707 B1 * | 10/2001 | Ishiyama et al. | 280/728.2 |
| 6,312,009 B1 | 11/2001 | Håland et al. | |
| 6,371,512 B1 * | 4/2002 | Asano et al. | 280/730.2 |
| 6,435,545 B1 * | 8/2002 | Osentoski et al. | 280/743.2 |
| 6,474,681 B2 * | 11/2002 | Peer et al. | 280/730.2 |
| 6,530,594 B1 | 3/2003 | Nakajima et al. | |
| 6,644,687 B2 * | 11/2003 | Saito et al. | 280/730.2 |
| 6,733,035 B2 * | 5/2004 | Thomas et al. | 280/730.2 |
| 6,783,152 B2 | 8/2004 | Tanase et al. | |
| 6,866,293 B2 | 3/2005 | Ogata | |
| 6,896,288 B2 * | 5/2005 | Tanaka et al. | 280/743.2 |
| 2004/0178608 A1 * | 9/2004 | Noguchi | 280/730.2 |

FOREIGN PATENT DOCUMENTS

| | | |
|---|---|---|
| JP | 2003-54351 A | 2/2003 |
| JP | 2004-67045 A | 3/2004 |

* cited by examiner

*Primary Examiner*—Paul N. Dickson
*Assistant Examiner*—Robert A. Coker
(74) *Attorney, Agent, or Firm*—Foley & Lardner LLP

(57) ABSTRACT

A curtain airbag device and a guide unit for facilitating assembly of a curtain-guide member and a guide element to a vehicle body. When an inflator is activated, a curtain airbag is led by a protruding piece of a curtain-guide member to be deployed along the cabin-side of a pillar garnish. During the deployment, the rear portion of the curtain airbag is guided by a guide rod via a link strap. The link strap starts moving downward along the guide rod when the curtain airbag begins to be deployed. The guide rod and the curtain-guide member are temporarily fixed to each other by a bolt in advance.

22 Claims, 5 Drawing Sheets

GUIDE UNIT FOR GUIDING CURTAIN AIRBAG AND CURTAIN AIRBAG DEVICE

BACKGROUND

The present invention relates to a guide unit for a guiding curtain airbag that is deployed along an inner side surface of a vehicle cabin. In particular, it relates to a guide unit provided with guiding means for guiding the curtain airbag to be deployed. The present invention also relates to a curtain airbag device provided with the guide unit.

In a vehicle provided with a curtain airbag device, when the vehicle is involved in, for example, a side-on collision or rollover, a curtain airbag is deployed downward along an inner side surface (for example, doors and pillars) of the vehicle cabin so as to protect the head of each vehicle occupant and to keep each vehicle occupant inside the vehicle cabin.

U.S. Pat. No. 6,237,938 (incorporated by reference herein in its entirety) discloses an example in which a guide element is disposed along a C pillar. Specifically, such a guide element is for guiding a rear portion of a curtain airbag, which is inflatable along the inner side surface of a vehicle cabin, downward along the pillar.

Moreover, such a guide element includes a track member having a box-shaped cross-section and a slider that is disposed within the track member and is movable in the longitudinal direction of the track member. The rear portion of a curtain airbag is fixed to the slider. In order to prevent the rear portion of each curtain airbag from being retracted upward after being moved downward, latches are disposed at a regular interval along the track member.

The top and bottom ends of each track member are provided with mounted flanges, and each of the flanges is fixed to the corresponding C pillar with a bolt or a screw.

Japanese Unexamined Patent Application Publication No. 11-91490 (incorporated by reference herein in its entirety) discloses a curtain-guide member that guides the curtain airbag such that it passes over the top end of a pillar garnish towards the interior of the vehicle cabin at the deployment of the curtain airbag.

SUMMARY

One embodiment of the invention relates to guide units for guiding a curtain airbag. The guide unit comprises a guide element attached to a pillar of a vehicle and extending in the vertical direction for guiding the end of a curtain airbag that is capable of being deployed downward along the inner side surface of the vehicle cabin; and a curtain-guide member for guiding the curtain airbag towards the interior of the vehicle cabin away from a pillar garnish at the beginning of deployment of the curtain airbag, wherein the curtain-guide member and the guide element are combined or engaged with each other.

According to another embodiment of the invention, a curtain airbag device is provided. The curtain airbag device comprises a curtain airbag that is capable of being deployed downward along an inner side surface of a vehicle cabin; and a guide unit for guiding the end of the curtain airbag. The guide unit comprises a guide element attached to a pillar of a vehicle and extending in the vertical direction for guiding the end of the curtain airbag; and a curtain-guide member for guiding the curtain airbag towards the interior of the vehicle cabin away from a pillar garnish at the beginning of deployment of the curtain airbag, wherein the curtain-guide member and the guide element are combined or engaged with each other.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1(*a*) illustrates a curtain airbag disposed along a roof side to a C pillar of a vehicle, and a guide rod of the curtain airbag. FIG. 1(*b*) is an enlarged perspective view around a B portion shown in FIG. 1(*a*). FIG. 1(*c*) illustrates a perspective view of the B portion shown in FIG. 1(*b*) provided with a pillar garnish.

FIG. 3(*b*) illustrates the curtain airbag deploying.

DETAILED DESCRIPTION

An object of the present invention is to provide a guide unit for guiding a curtain airbag, in which a curtain-guide member and a guide element for guiding the curtain airbag during the deployment are integrated with each other so as to be easily assembled in the vehicle body, and a curtain airbag device provided with the guide unit.

The guide unit according to an embodiment of the present invention includes a guide element attached to a pillar of a vehicle and extending in the vertical direction for guiding the ends of a curtain airbag that is capable of being deployed downward along the inner side surface of the vehicle cabin; and a curtain-guide member for guiding the curtain airbag towards the interior of the vehicle cabin away from a pillar garnish at the beginning of deployment of the curtain airbag. The guide unit is characterized in that the curtain-guide member and the guide element are combined or engaged with each other.

The curtain airbag device according to an embodiment of the present invention includes the guide unit according to the present invention as a guiding unit.

According to the guide unit of an embodiment of the present invention, the curtain-guide member and the guide element are combined or engaged with each other in advance, and thus the integrated components can easily be assembled in the vehicle body.

When a link strap protruding from the curtain airbag engages with the guide element, the curtain-guide member can prevent the link strap from becoming detached from the guide element.

According to an embodiment of the present invention, the curtain-guide member and the guide element are connected to each other by a bolt. In this case, the curtain-guide member and the guide element can be fixed together to the vehicle body by the bolt.

According to another embodiment of the present invention, the curtain-guide member and the guide element are fixed to each other by fixing means. In this case, since the curtain-guide member and the guide element are rigidly combined, the integrated components can easily be assembled in the vehicle body. As the fixing means, welding or riveting is preferable in view of ease and strength.

According to another embodiment of the present invention, at least either one of the curtain-guide member and the guide element has an engaging portion for engaging the other, and the curtain-guide member and the guide element are engaged with each other via the engaging portion. With this structure, the curtain-guide member and the guide element can be temporarily fixed to each other, and thus the curtain-guide member and the guide element can be assembled in the vehicle body even when the vehicle has a different shape.

According to the curtain airbag device and the guide unit of the present invention, the curtain-guide member and the guide element can easily be assembled in the vehicle body.

Figure 1A:
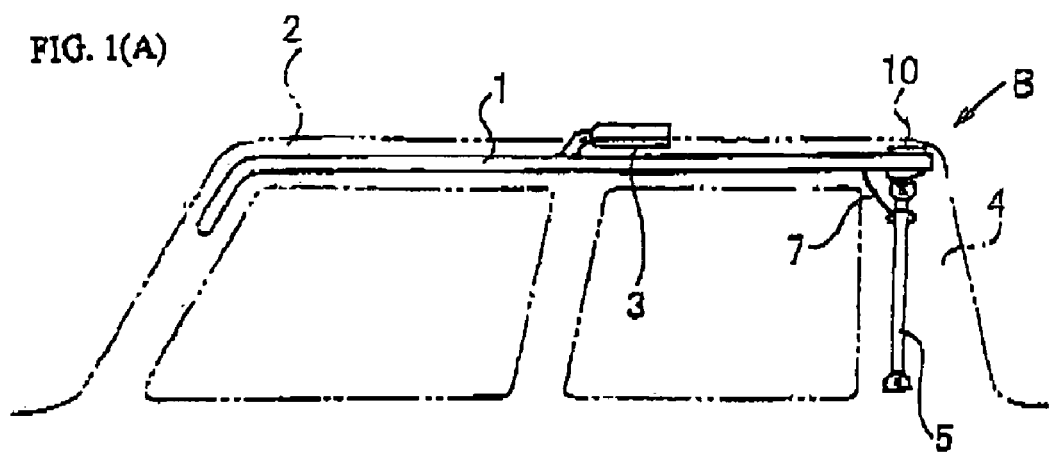
FIGS. 1(*a*), 1(*b*), and 1(*c*) illustrate a guide unit for guiding a curtain airbag according to an embodiment of the present invention.
Figure 1B:
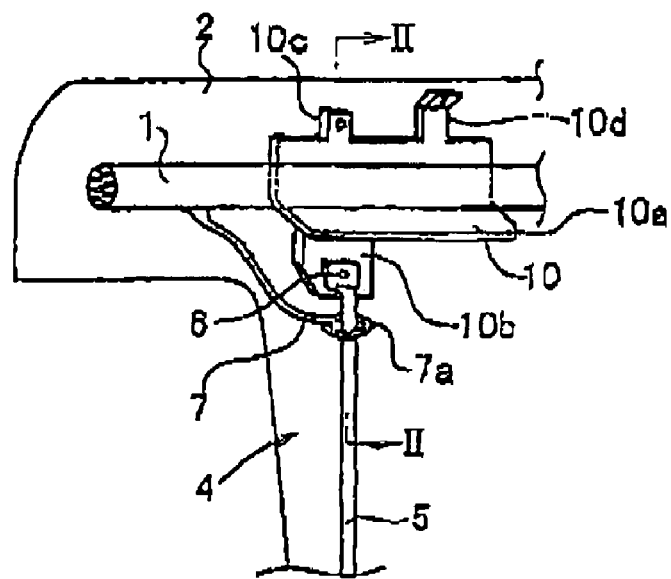
Figure 1C:
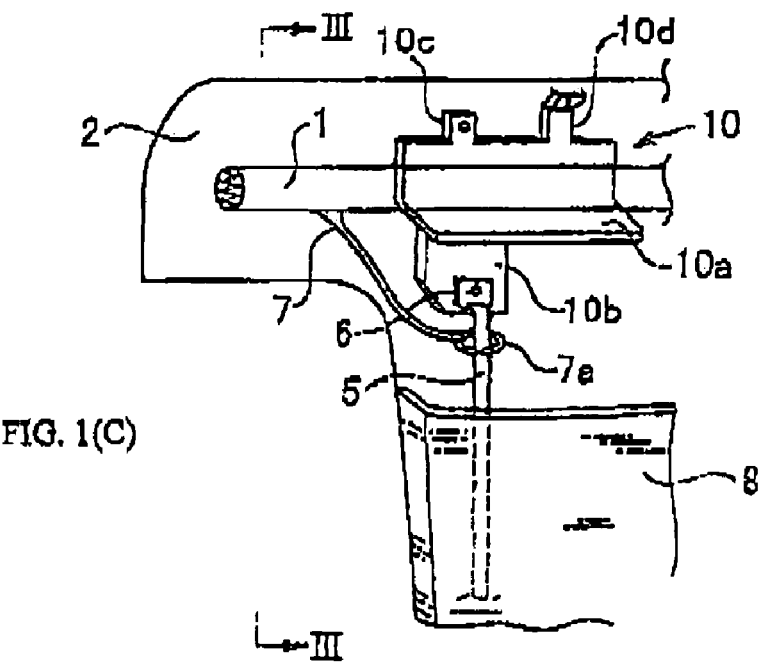
Figure 2:
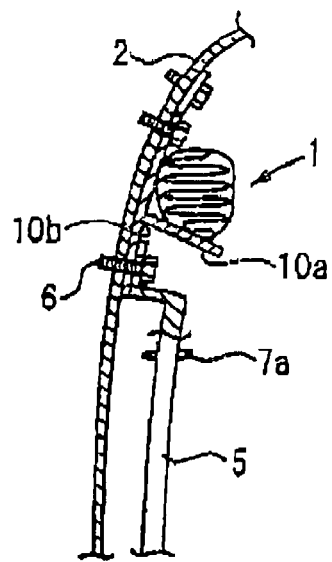
FIG. 2 is a cross-sectional view taken along line II-II in FIG. 1(*b*).
Figure 3A:
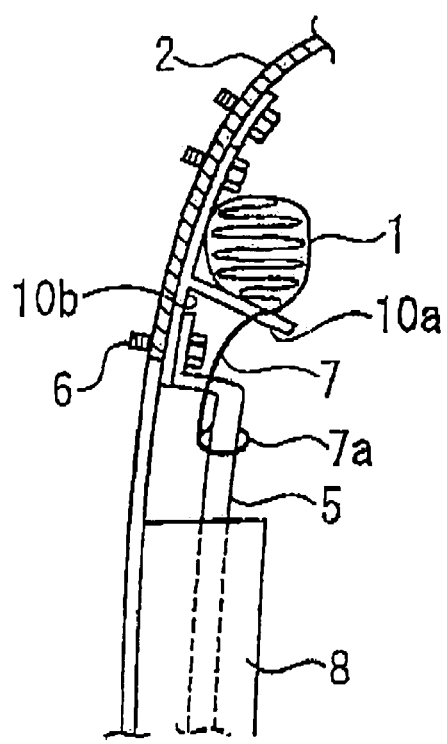
FIG. 3(*a*) is a cross-sectional view taken along line III-III in FIG. 1(*c*)
Figure 3B:
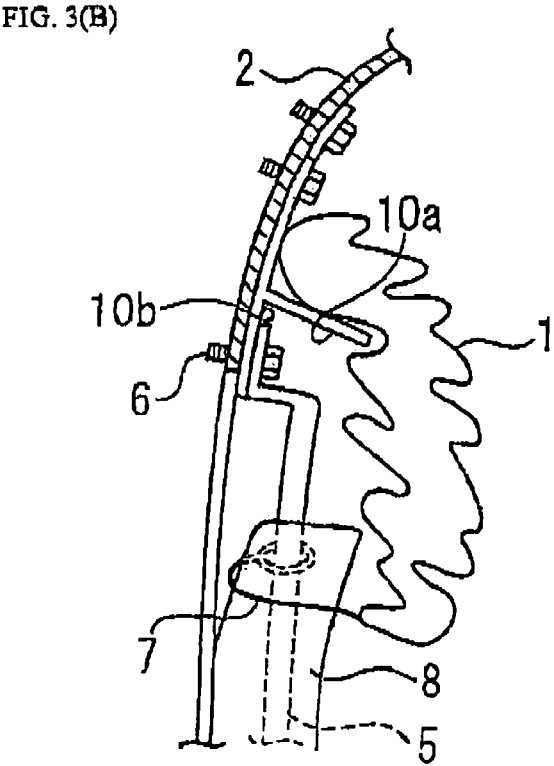
Figure 4:
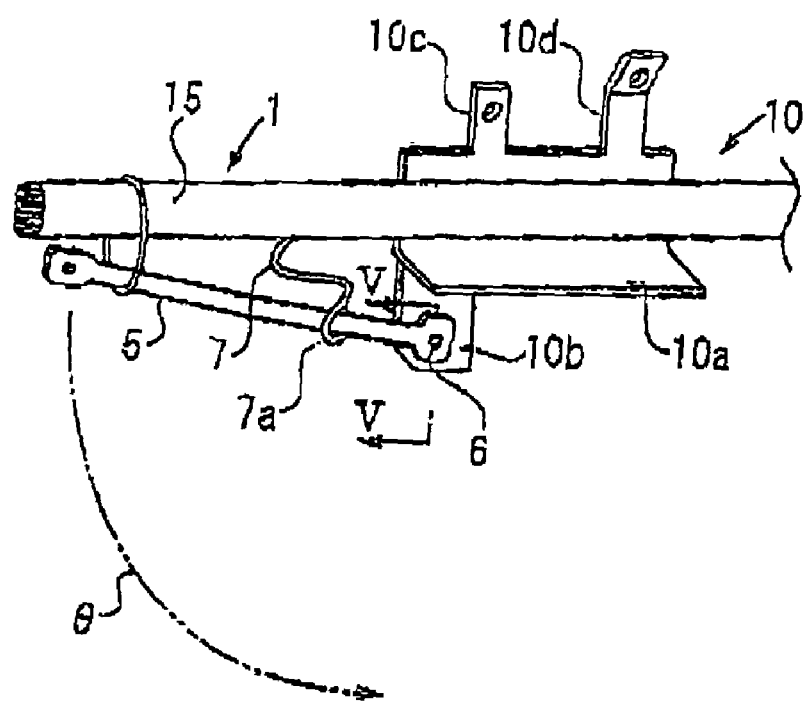
FIG. 4 is a perspective view illustrating the embodiment shown in FIG. 1 before being assembling components in a vehicle body.
Figure 5:
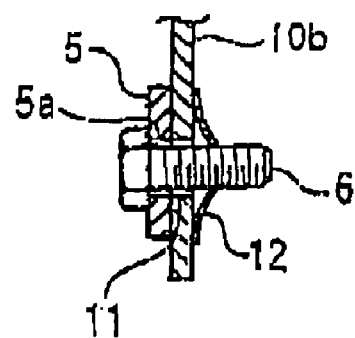
FIG. 5 is a cross-sectional view taken along line V-V in FIG. 4.

Embodiments will now be described with reference to the drawings. FIG. 1 illustrates a curtain airbag device and a guide unit thereof according to an embodiment of the present invention. FIG. 1(a) illustrates a curtain airbag disposed along a roof side to a C pillar of a vehicle, and a guide rod of the curtain airbag. FIG. 1(b) is an enlarged perspective view around a B portion shown in FIG. 1(a). FIG. 1(c) illustrates a perspective view of the B portion shown in FIG. 1(b) provided with a pillar garnish. In FIGS. 1(a) and 1(b), the pillar garnish is not illustrated. FIG. 2 is a cross-sectional view taken along line II-II in FIG. 1(b). FIG. 3(a) is a cross-sectional view taken along line III-III in FIG. 1(c), and FIG. 3(b) illustrates the curtain airbag being deployed. FIG. 4 is a perspective view of the guide unit before being assembled in the vehicle body. FIG. 5 is a cross-sectional view taken along line V-V in FIG. 4.

According to this embodiment, a curtain airbag 1 is disposed along a roof side 2 of a vehicle (border section between the ceiling and inner side surface of a vehicle cabin) while being folded in a slender manner in the longitudinal direction of the vehicle. When a vehicle is involved in a side-on collision or a rollover, for example, the curtain airbag 1 is inflated as a result of gas sent from an inflator 3. The curtain airbag 1 is deployed in the downward direction of the vehicle body along the side surface, i.e. doors and pillars, in the vehicle cabin. An upper edge of the curtain airbag 1 is provided with tabs (not shown) that are fastened to the roof side 2.

A C pillar 4 of the vehicle has a guide rod 5 attached thereto, which functions as a guide element for guiding the rear portion of the curtain airbag 1 along the C pillar 4 while the curtain airbag 1 is being deployed along the C pillar 4 in the downward direction of the vehicle body. The guide rod 5 has a rod-like structure that extends along the C pillar 4 in the vertical direction of the vehicle body. Both the upper and lower ends of the guide rod 5 are fixed to the C pillar 4 with bolts 6. Each of the bolts 6 is inserted into a through hole 5a shown in FIG. 5.

The bottom corner area in the rear portion of the curtain airbag 1 has a base end of a link strap 7 attached thereto. On the other hand, a loop 7a at a front end of the link strap 7 is loosely fixed around the guide rod 5. The loop 7a is movable along the guide rod 5 in the vertical direction.

The cabin-side of the C pillar 4 is covered with a pillar garnish 8. A weather strip (not shown) is attached to the doorframe portion of the C pillar 4, and is in contact with the side edge of the pillar garnish 8.

A curtain-guide member 10, known as a jump base, is disposed on the roof side 2 above the C pillar 4. At the beginning of deployment of the curtain airbag 1, the curtain-guide member 10 allows the curtain airbag 1 to jump over the top of the pillar garnish 8 so as to guide the curtain airbag 1 towards the interior of the vehicle cabin. As shown in FIG. 2, a protruding piece 10a of this curtain-guide member 10 protrudes downslope from the roof side 2 towards the interior of the vehicle cabin.

In this embodiment, the curtain-guide member 10 is integrated with a hanging piece 10b hanged downward therefrom, and the hanging piece 10b is provided with a bolt through hole 11 shown in FIG. 5.

As shown in FIG. 5, the bolt 6 is inserted into the bolt through hole 11 of the hanging piece 10b through the through hole 5a of the guide rod 5 and is temporally tacked with a star washer 12. This star washer 12 has elastic projections each extending to the center and each tip of the projections is in tight contact with the thread face of the bolt 6.

As shown in FIG. 4, in this guide unit, the guide rod 5 is rotated about the bolt 6 and is disposed close to the curtain airbag 1 by a binding band 15 that bundles the guide rod 5 and the curtain airbag 1 before the guide unit is attached to the vehicle body.

In an assembly line of vehicles, the binding band 15 is removed to rotate the guide rod 5 by about 90 degrees in the direction of an arrow □.

The curtain-guide member 10 is fixed to the roof side 2 by bolting brackets 10c and 10d protruding upward from the curtain-guide member 10, and by bolting the hanging piece 10b protruding downward from the curtain-guide member 10. The hanging piece 10b is fixed to the roof side 2 together with the top end of the guide rod 5 by the bolt 6.

Although not shown in FIGS. 1 to 3, the roof side 2 is provided with a roof-side garnish that also covers the curtain airbag 1. This roof-side garnish is disposed so as to face the pillar garnish 8.

When a vehicle provided with such a curtain airbag device is involved in a side-on collision or a rollover, the inflator 3 generates gas so as to inflate the curtain airbag 1. The curtain airbag 1 pushes open the roof-side garnish, and, as shown in FIG. 3(b), the protruding piece 10a of the curtain-guide member 10 allows the curtain airbag 1 to jump over the top end of the pillar garnish 8 so as to guide the curtain airbag 1 towards the interior of the vehicle cabin. Subsequently, the curtain airbag 1 is deployed downward along the cabin-side of a pillar garnish 8.

The rear portion of the deploying curtain airbag 1 is guided by the guide rod 5 via the link strap 7. The link strap 7 starts moving downward along the guide rod 5 when the curtain airbag 1 begins to be deployed. At this moment, as shown in FIG. 3(b), the link strap 7 is guided into the space between the pillar garnish 8 and the weather strip. The link strap 7 moves downward while ripping through the pillar garnish 8 and the weather strip during the deployment of the curtain airbag 1.

The link strap 7 moves downward along the guide rod 5 until the curtain airbag 1 reaches the bottommost point of deployment. Since the link strap 7 connects the curtain airbag 1 and the guide rod 5, the curtain airbag 1 can be deployed along the side surface of the vehicle cabin.

In this embodiment, as shown in FIG. 4, both the curtain-guide member 10 and the guide rod 5 are fixed to the vehicle body by the bolt 6, and thus the man-hours required for assembling the curtain-guide member 10 and the guide rod 5 can be reduced.

In this embodiment, since the curtain-guide member 10 and the guide rod 5 are integrated by the bolt 6 in advance, assembling work for the curtain-guide member 10 and the guide rod 5 is not required in the vehicle assembly line. As a result, the work in the line is simplified. Moreover, this arrangement can prevent the loop 7a of the link strap 7 from becoming detached from the guide rod 5. Since the guide rod 5 is disposed close to the folded curtain airbag 1, the volume of the package required for these components is small to facilitate, for example, transportation.

Other embodiments of the present invention will now be described with reference to FIGS. 6 to 8.

Figure 6:
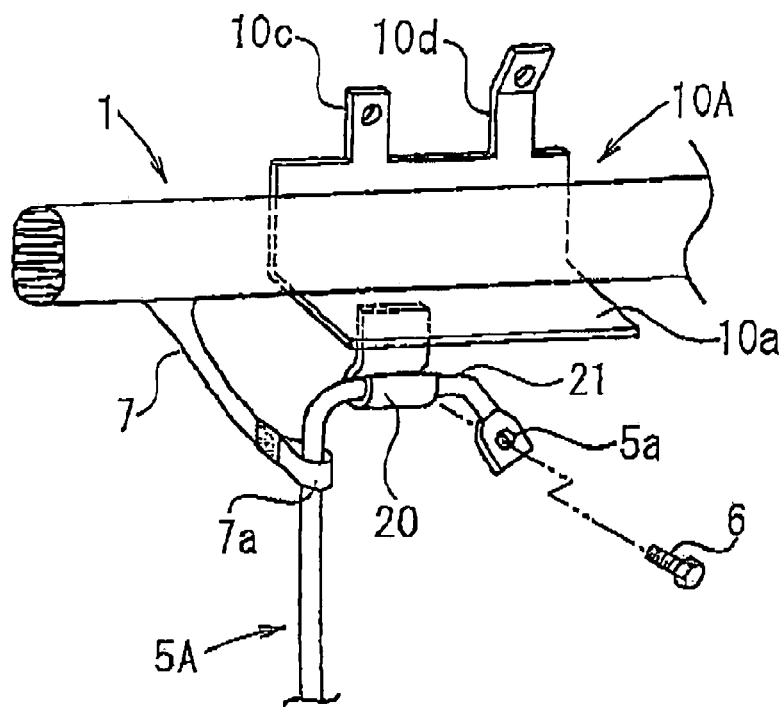
FIG. 6 is a perspective view illustrating another embodiment of the present invention.

In the embodiment shown in FIG. 6, a curtain-guide member 10A provided with a hook 20, instead of the hanging piece 10b, and a guide rod 5A provided with a horizontal portion 21 that is perpendicular to the guide rod 5A and engages with the hook 20 are employed.

The hook 20 has a C-shaped cross-section with a closed bottom so as to fit into the horizontal portion 21. The horizontal portion 21 is a rod extending substantially in the horizontal direction. Since the horizontal portion 21 is fitted to the hook 20, the bottom end of the guide rod 5A can swing.

This guide rod 5A is fixed to the vehicle body at the top portion by the bolt 6 inserted into through hole 5a provided in the end of the horizontal portion 21. The bottom portion of the guide rod 5A is also fixed to the vehicle body by a bolt. Structures other than these components are the same as in the above-described embodiment.

Also in this embodiment, the curtain-guide member 10A and the guide rod 5A are integrated in advance by engaging the hook 20 with the horizontal portion 21. Accordingly, the work required in assembling these components in the vehicle body can be simplified, and the loop 7a of the link strap 7 can be prevented from becoming detached from the guide rod 5A before these components are assembled in the vehicle body. Furthermore, by rotating the guide rod 5A about the hook 20, these components can be assembled even when the inner side surface of the vehicle body has a different shape.

Figure 7:
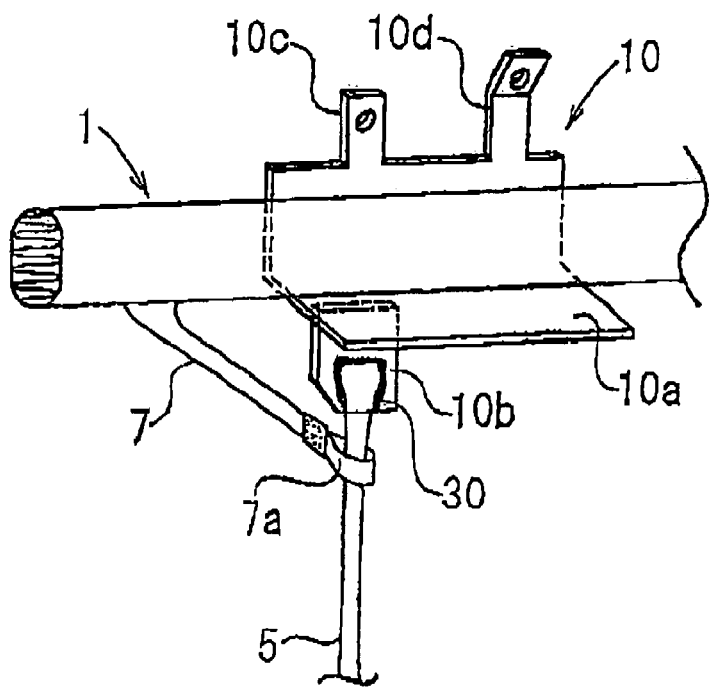
FIG. 7 is a perspective view illustrating another embodiment of the present invention.

In the embodiment shown in FIG. 7, the top end of the guide rod 5 according to the embodiment shown in FIGS. 1 to 4 is firmly fixed to the hanging piece 10b by welding (a weld 30 is shown in FIG. 7). In the embodiment shown in FIG. 8, the top end of the guide rod 5 is firmly fixed to the hanging piece 10b by a rivet 40, rather than by welding. Structures other than these components are the same as in the embodiment shown in FIGS. 1 to 4.

Figure 8:
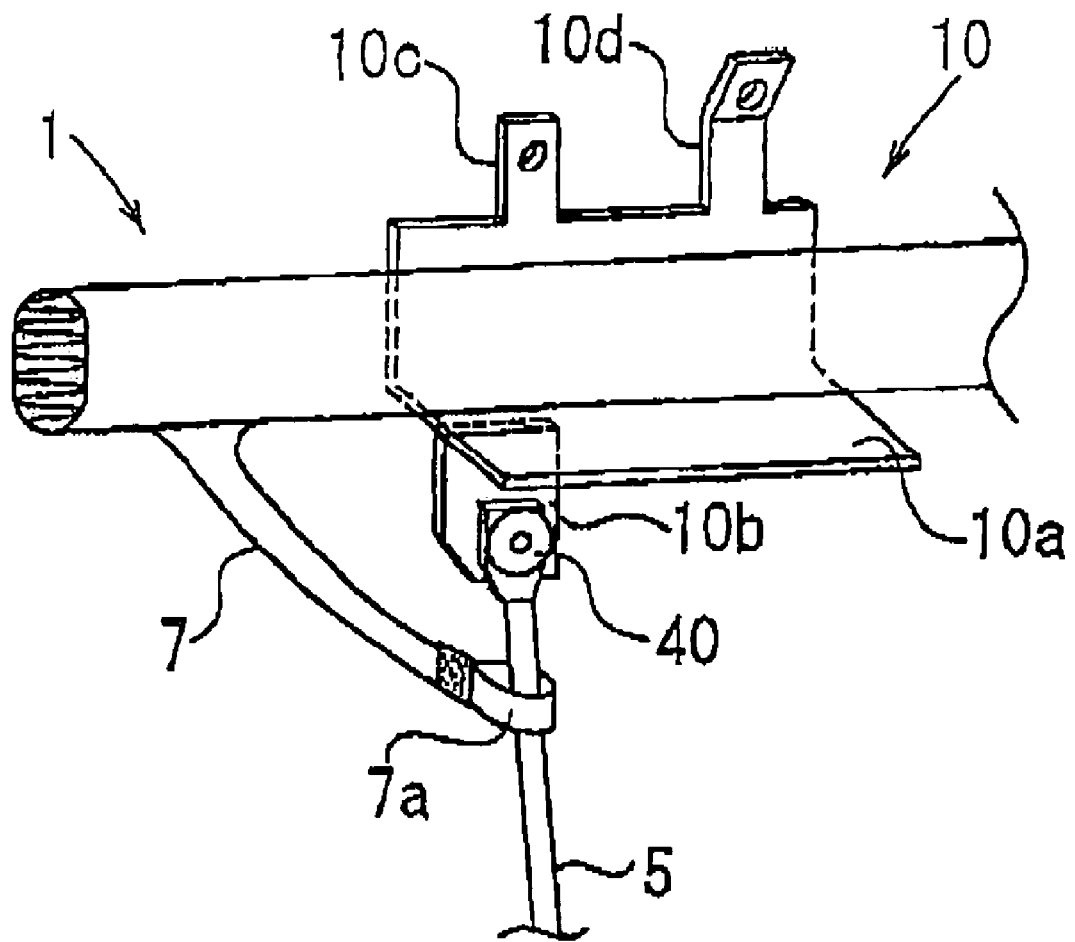
FIG. 8 is a perspective view illustrating another embodiment of the present invention.

Also in the embodiments shown in FIGS. 7 and 8, the curtain-guide member 10 and the guide rod 5 are integrated in advance. Accordingly, the work required in assembling these components in the vehicle body can be simplified, and the loop 7a can be prevented from becoming detached from the guide rod 5 before these components are assembled in the vehicle body. In particular, since the curtain-guide member 10 and the guide rod 5 are firmly fixed and are integrated with each other by welding or riveting in these embodiments, the guide rod 5 is bolted to the vehicle body only at the bottom end, and the curtain-guide member 10 is bolted to the vehicle body only at the brackets 10c and 10d. Thus, the man-hours required for bolting can be remarkably reduced.

The technical scope of the present invention is not limited to the above embodiments, and modifications are permissible within the scope of the present invention. For example, the guide rod and the curtain-guide member may be disposed so as to guide the curtain airbag along a B pillar or an A pillar. Furthermore, guide elements other than the guide rod may be employed.

Japan Priority Application 2003-423080, filed Dec. 19, 2003 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A guide unit for guiding a curtain airbag, comprising:
    a guide element attached to a pillar of a vehicle and extending in the vertical direction for guiding the end of a curtain airbag that is capable of being deployed downward along the inner side surface of the vehicle cabin; and
    a curtain-guide member for guiding the curtain airbag towards the interior of the vehicle cabin away from a pillar garnish at the beginning of deployment of the curtain airbag, wherein the curtain guide member includes a protruding portion over which the curtain airbag is guided, the protruding portion being positioned above the guide element, and wherein the curtain-guide member and the guide element are combined or engaged with each other.

2. The guide unit according to claim 1, further comprising:
    a strap protruding from the curtain airbag and engaging with the guide element.

3. The guide unit according to claim 2, wherein the curtain-guide member is configured to prevent the strap from detaching from the guide element.

4. The guide unit according to claim 1, wherein the curtain-guide member and the guide element are connected to each other by a bolt.

5. The guide unit according to claim 1, wherein the curtain-guide member and the guide element are fixed to each other.

6. The guide unit according to claim 5, wherein the curtain-guide member and guide element are welded or riveted together.

7. The guide unit according to claim 5, wherein the curtain-guide member and the guide element are rigidly connected together.

8. The guide unit according to claim 1, wherein
    at least either one of the curtain-guide member and the guide element has an engaging portion for engaging the other; and
    the curtain-guide member and the guide element are engaged with each other via the engaging portion.

9. The guide unit according to claim 8, wherein the curtain-guide member and guide element are temporarily fixed to each other.

10. A curtain airbag device, comprising:
a curtain airbag that is capable of being deployed downward along an inner side surface of a vehicle cabin; and
a guide unit for guiding the end of the curtain airbag, the guide unit comprising:
a guide element attached to a pillar of a vehicle and extending in the vertical direction for guiding the end of the curtain airbag; and
a curtain-guide member for guiding the curtain airbag towards the interior of the vehicle cabin away from a pillar garnish at the beginning of deployment of the curtain airbag, wherein the curtain guide member includes a protruding portion over which the curtain airbag is guided, the curtain airbag being positioned on a top surface of the protruding portion prior to inflation of the curtain airbag,and wherein the curtain-guide member and the guide element are combined or engaged with each other.

11. The curtain airbag device according to claim 10, further comprising:
a strap protruding from the curtain airbag and engaging with the guide element.

12. The curtain airbag device according to claim 11, wherein the curtain-guide member is configured to prevent the strap from detaching from the guide element.

13. The curtain airbag device according to claim 10, wherein the curtain-guide member and the guide element are connected to each other by a bolt.

14. The curtain airbag device according to claim 10, wherein the curtain-guide member and the guide element are fixed to each other.

15. The curtain airbag device according to claim 14, wherein the curtain-guide member and the guide element are welded or riveted together.

16. The curtain airbag device according to claim 14, wherein the curtain-guide member and the guide element are rigidly connected together.

17. The curtain airbag device according to claim 10, wherein
at least either one of the curtain-guide member and the guide element has an engaging portion for engaging the other; and
the curtain-guide member and the guide element are engaged with each other via the engaging portion.

18. The curtain airbag device according to claim 17, wherein the curtain-guide member and guide element are temporarily fixed to each other.

19. The guide unit according to claim 1, wherein the guide element is fixed to a hanging piece extending from the guide member.

20. The guide unit according to claim 1, wherein the guide element is fixed to the guide member with welding, and the guide element and guide member are fixed to the vehicle body via a bolt.

21. A guide unit for guiding a curtain airbag, comprising:
a guide element attached to a pillar of a vehicle and extending in the vertical direction for guiding the end of a curtain airbag that is capable of being deployed downward along the inner side surface of the vehicle cabin; and
a curtain-guide member for guiding the curtain airbag towards the interior of the vehicle cabin away from a pillar garnish at the beginning of deployment of the curtain airbag, wherein the curtain-guide member and the guide element are combined or engaged with each other such that the curtain-guide member and the guide element are rigidly connected together.

22. A curtain airbag device, comprising:
a curtain airbag that is capable of being deployed downward along an inner side surface of a vehicle cabin; and
a guide unit for guiding the end of the curtain airbag, the guide unit comprising:
a guide element attached to a pillar of a vehicle and extending in the vertical direction for guiding the end of the curtain airbag; and
a curtain-guide member for guiding the curtain airbag towards the interior of the vehicle cabin away from a pillar garnish at the beginning of deployment of the curtain airbag, wherein the curtain-guide member and the guide element are combined or engaged with each other such that the curtain-guide member and the guide element are rigidly connected together.

* * * * *